United States Patent [19]
Briancon et al.

[11] Patent Number: 5,940,741
[45] Date of Patent: Aug. 17, 1999

[54] METHOD AND APPARATUS ARRANGED TO REDUCE TRAFFIC ON A NETWORK CHANNEL

[75] Inventors: Alain Charles Louis Briancon, McKinney; Terence Edward Sumner, Azle, both of Tex.

[73] Assignee: Motorola, Inc.,, Schaumburg, Ill.

[21] Appl. No.: 08/771,617

[22] Filed: Dec. 20, 1996

[51] Int. Cl.$^6$ ....................................................... H04Q 7/12
[52] U.S. Cl. ................... 455/31.3; 455/525; 340/825.21; 370/447; 370/461
[58] Field of Search .................................. 455/31.1, 31.3, 455/38.1, 525; 340/825.44, 825.21; 370/313, 319, 320, 336, 337, 347, 445, 447, 458, 459, 461

[56] References Cited

U.S. PATENT DOCUMENTS

| | | | |
|---|---|---|---|
| 5,521,926 | 5/1996 | Ayerst et al. ............................ | 455/31.1 |
| 5,638,369 | 6/1997 | Ayerst et al. ............................ | 370/346 |
| 5,712,624 | 1/1998 | Ayerst et al. ....................... | 340/825.21 |

*Primary Examiner*—Wellington Chin
*Assistant Examiner*—Lee Nguyen
*Attorney, Agent, or Firm*—Charles W. BEthards

[57] ABSTRACT

A system controller (105), and analogous method, for a two way selective messaging system (100) that is arranged to reduce traffic on a network channel (109) that intercouples a plurality of base receivers (115–118, 125–128) includes a source port (303) for receiving a message from a message source, a memory (305) for storing a data base including an activity pattern of the plurality of base receivers, a processor (307), coupled to the source port and the memory for selecting an inbound schedule for a response from a selective messaging unit (131) where the inbound schedule is selected to reduce traffic, corresponding to the inbound schedule, on the network channel, and a transmit port (107) for sending the message along with the inbound schedule to a transmitter (111). A two way selective messaging unit (131), and analogous method, includes a memory (413) for storing a preferred transmitter ID and an activity pattern corresponding to a set of base receivers associated with the preferred transmitter, a controller (411), coupled to the memory, for selecting an inbound schedule for delivery of a message where the inbound schedule is selected to reduce traffic on the network channel, and a transmitter (407) for transmitting the message in accordance with the inbound schedule.

25 Claims, 4 Drawing Sheets

1

METHOD AND APPARATUS ARRANGED TO REDUCE TRAFFIC ON A NETWORK CHANNEL

FIELD OF THE INVENTION

This invention concerns the traffic on a network channel of messaging system and more specifically but not limited to methods and apparatus arranged to reduce such traffic.

BACKGROUND OF THE INVENTION

Messaging systems are known. Two way paging or messaging systems have recently been deployed. Two way systems in addition to being able to send a message to a selective messaging receiver or unit are arranged and constructed to receive messages that originate at such a unit. Two way systems in addition to having an outbound or transmit system directed to message delivery have an inbound or receiving system arranged for receiving messages from selective messaging units. The ability to receive messages allows the service provider to offer guaranteed message delivery or the capability of a messaging unit to originate messages and inquiries.

For various reasons, such as unit size and battery life thus low power small messaging unit power amplifiers, current two way systems have unbalanced outbound and inbound paths such that typical two way systems are deployed with significantly more base receivers than transmitters. Unfortunately when enough base receivers have been deployed to assure inbound coverage many messaging units can be within the reception range of numerous base receivers. Base receivers are ordinarily coupled to a central system control point or system controller by a network channel that is often leased by the service provider from a common carrier such as telephone company.

The magnitude of the lease fees for the network channel often depend on the amount of traffic carried over the network channel. Historically each base receiver that receives a message from a messaging unit will forward that message as received regardless of accuracy to the system controller. Often all but one of these messages is an unnecessary duplication of traffic that in turn result in higher lease fees. Clearly a need exists for methods and equipment that will reduce traffic on the network channel.

BRIEF DESCRIPTION OF THE DRAWINGS

The features of the present invention that are believed to be novel are set forth with particularity in the appended claims. However, the invention together with further advantages thereof, may best be understood by reference to the accompanying drawings wherein:

DETAILED DESCRIPTION OF THE PREFERRED EMBODIMENT

The present invention is set in a two way selective messaging system including a system controller or controller coupled to a plurality of base receivers by a network channel and further coupled to a plurality of transmitters by a forward network channel. The selective messaging system is arranged to provide message delivery to messaging units on an outbound channel and message reception from messaging units on an inbound channel. A preferred method embodiment and an alternative method embodiment with differing scope is directed to reducing traffic on the network channel.

The preferred method includes providing a message for delivery to a selective messaging unit, selecting an inbound schedule for a response message from the selective messaging unit where the inbound schedule is selected in accordance with an activity pattern of the plurality of base receivers thereby reducing traffic, corresponding to the response message, on the network channel, and then transmitting the message on the forward channel along with the inbound schedule. Various approaches for selecting the inbound schedule are discussed including ones that represent managed activity patterns for the base receivers and further improvements in network traffic based on a "quality" of the message received at the base receivers. The alternative method is discussed from the perspective of a messaging unit originating a message. The methods are preferably practiced at a system controller or alternatively a messaging unit.

The system controller for the two way selective messaging system is discussed where the system controller is arranged to control message delivery on an outbound channel and message reception on an inbound channel so as to reduce traffic on the network channel. The system controller includes a source port for receiving a message from a message source for delivery to a selective messaging unit, a memory for storing a data base including an activity pattern of the plurality of base receivers, a processor, coupled to the source port and the memory for selecting an inbound schedule for a response from the selective messaging unit where the inbound schedule is selected in accordance with the activity pattern of the plurality of base receivers thereby reducing the traffic on the network channel corresponding to the inbound schedule, and a transmit port for sending the message along with the inbound schedule to a transmitter.

Figure 1:
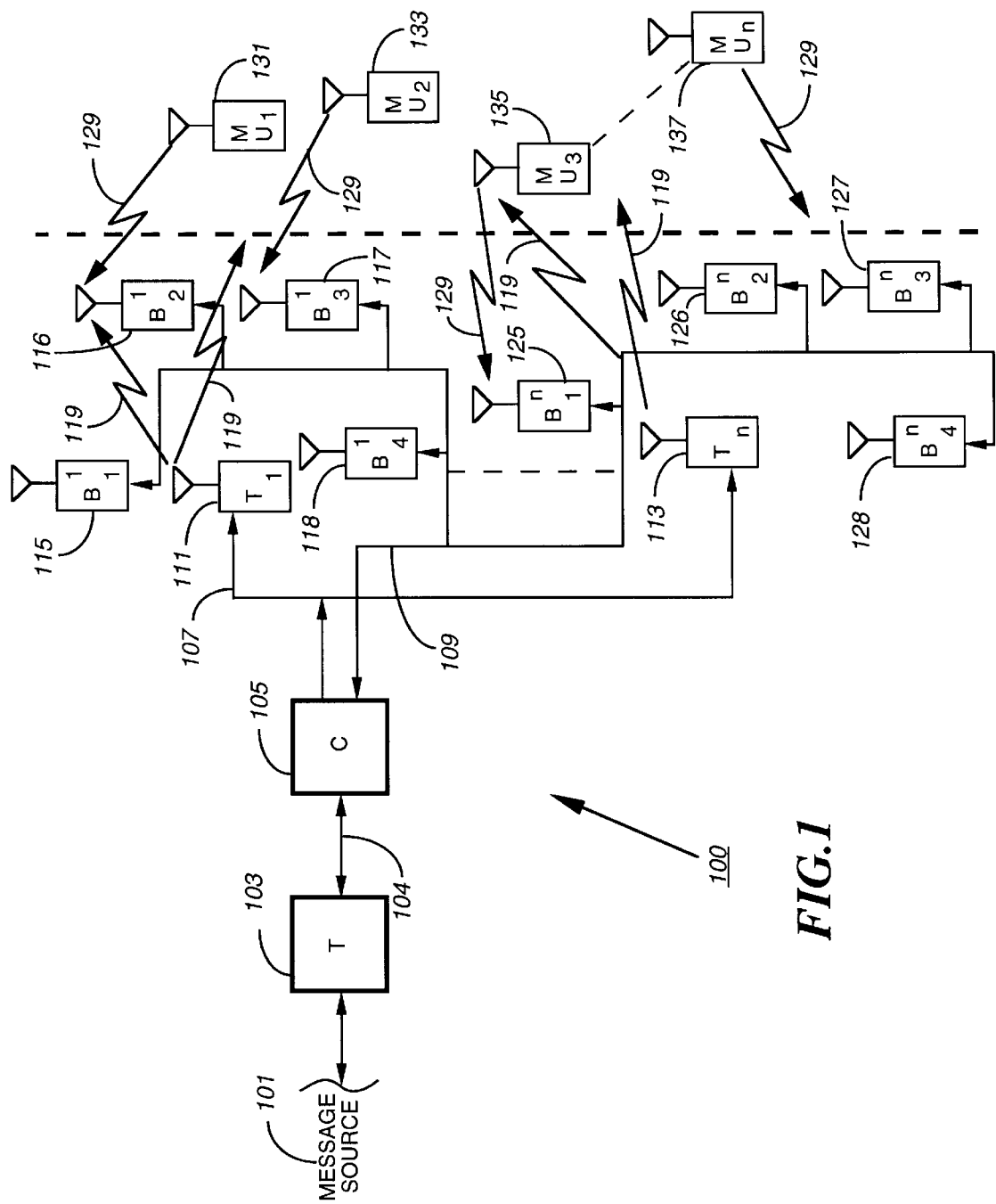
FIG. 1 depicts in exemplary form, a messaging system in accordance with a preferred embodiment of the present invention.

For a clearer understanding of the present disclosure the reader is referred to the FIG. 1 depiction of a representative messaging system (100), preferably, selective two way messaging system communicating with a plurality of messaging units. The messaging system includes a gateway or terminal (103) coupled to a message source such as the public switched telephone network (101). The terminal is available from Motorola as the WMG™ product as well as other manufacturers. The terminal is coupled to, often collocated with, a system controller or controller (105), such as a Motorola RF CONDUCTOR™ suitably modified with the inventive principles discussed herein. The terminal and system controller operate together to communicate messages with destination addresses for various messaging units from the terminal to the system controller or various responses back to the terminal, thus PSTN and originator.

The messaging system includes, coupled to the controller by the outbound network channel (107), a plurality of transmitters with two depicted as a first and nth transmitter (111 . . . 113). The transmitters are available as Motorola NUCLEUS II™ transmitters. The outbound network channel (107) is preferably leased telephone lines but may be any suitable media operating with any suitable networking or communication protocol including a radio link. The system, specifically controller and transmitters are arranged and constructed to operate in either a simulcast or non-simulcast mode. The particular equipment, such as a satellite or GPS based system typically used to provide the timing information with the degree of accuracy associated with or required for simulcast operation is, generally known, not further relevant nor further discussed, and not specifically shown.

Additionally, the messaging system includes, coupled to the system controller by a network channel (109), a plurality of base receivers, such as eight depicted base receivers (115–118 and 125–128). The network channel is preferably leased telephone lines or any other network link with a recurring cost commensurate with the used bandwidth or amount of traffic on the network channel. Typically at least some of the base receivers will be deployed at different geographic locations than the transmitters and typically two to four are deployed for each transmitter.

Generally the messaging system is a scheduled system using a protocol such as the ReFLEX™ protocol by Motorola where all messages outbound or inbound are transmitted within time slots in a time frame. The system controller provides control of the system including scheduling outbound or, within limits, inbound messages for messaging units that are registered on or subscribe to the system's services. The system controller is responsible for maintaining the schedule, designating when within the overall schedule a message for a messaging unit will be transmitted, notifying messaging units of the time slot where they will receive messages and during what inbound time slot they are expected to acknowledge receipt of the message and what inbound slots are available for volitionally originated messages, according to a slotted ALOHA contention algorithm.

The outbound messages are forwarded to the transmitters for subsequent transmission to one or more messaging units, such as the depicted messaging units (MU) (131, 133, 135, 137) in accordance with the system protocol at a particular time on the forward or outbound radio channel (119). Messages originating at the messaging units, either volitionally as in a registration request or responsive to a received message, such as an acknowledgment, are coupled by the reverse or inbound radio channel (129) to one or more of the base receivers where they are forwarded or relayed to the system controller on the inbound or network channel (109). The system controller may use these inbound messages for scheduling decisions, such as repeats, may forward them to the terminal, if, for example, they are intended for a user destination, or may use them to perform various traffic analysis and system management or configuration functions.

Some of the inventive approaches discussed here require or are enhanced with a knowledge of the location of an MU. Copending application titled "Apparatus And Method For Selecting A Transmitter For Directed Message Delivery" by Souissi et-al assigned to the same assignee as here and having a like filing date discusses in detail one preferred approach for determining the location of an MU, relative to the base transmitters. This application is hereby incorporated herein by reference.

In summary the location of an MU is determined relative to the messaging system transmitters as follows. Each transmitter transmits in a simulcast mode at a predetermined time, such as the SYNC portion of the outbound channel frame, a radio frequency carrier modulated by a unique identification tone, separated from other identification tones by 200 Hz, and a common reference tone of 1000 Hz. Each receiver receives this SYNC portion of the frame and by noting the relative magnitudes and locations of the identification tones relative to the reference tone can determine the base stations that are relatively close in terms of path loss.

Generally speaking in a practical messaging system the plurality of transmitters all transmit in a simulcast mode with each transmitter having a unique identification signal, preferably unique transmitter identification tone and a common reference parameter or reference signal, preferably reference tone. The system controller is responsible for assigning the unique identification signal to each base station within a cluster or grouping of base stations with same identification signals reassigned only within a different cluster using well known principles of reuse from spatial diversity systems such as cellular systems. The preferred system is a scheduled messaging system, such as a Motorola ReFLEX™ or inFLEXion™ system modified in accordance with the inventive principles disclosed herein. This system has a frame and time slot organized forward or outbound and reverse or inbound radio channel protocol, such as depicted in representative and partial form in FIG. 2.

Figure 2:
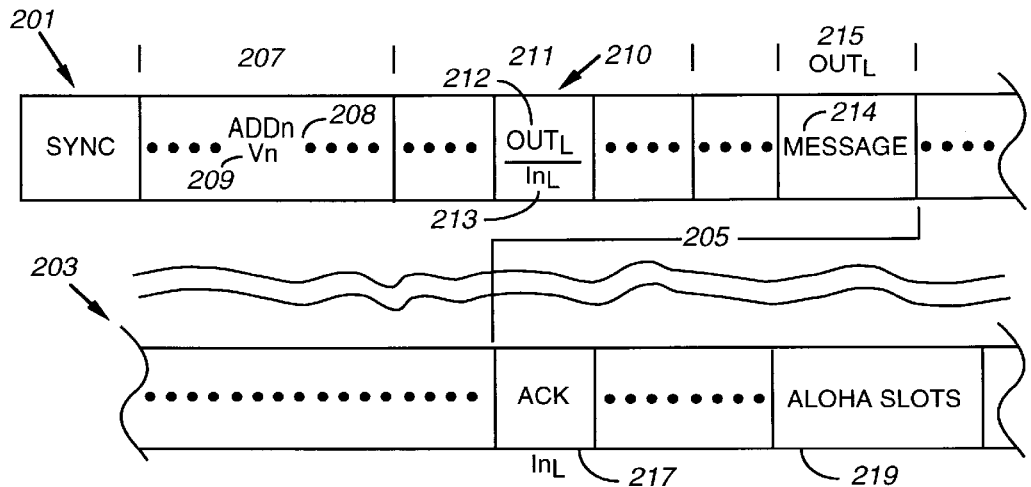
FIG. 2 shows a partial channel frame structure suitable for use in the FIG. 1 messaging system.

FIG. 2 depicts a representative portion of an outbound channel frame (201) and a portion of the inbound channel frame (203) where the depicted portion of the inbound frame is usually delayed by an amount (205) on the order of 15 seconds or more. The outbound frame includes a SYNC portion that may be used to establish frame and bit synchronization as well as communicate other system overhead information such as data rate channel frequencies and the like.

Additionally an address field (207) is included and this is used to list the addresses of MUs, such as ADDn (208), that have a message pending and a vector Vn (209) that specifies the location (210) in a vector field (211) of additional information concerning the pending message. The contents of location (210) include the outbound location ($OUT_L$) (212) of the message (214) within a message field (215), the duration of the message, and the like in addition to the inbound location ($IN_L$) (213) or designated time slot that has been scheduled for the MU to provide or transmit any response or acknowledgment messages.

In addition to scheduled inbound time slots there are a plurality of unscheduled or ALOHA slots (219). The boundary between scheduled and unscheduled inbound slots is specified in the overhead portion of the outbound frame and can be varied as traffic requires. For example during morning hours there may be a heavy load of MU registrations and a relatively large number of unscheduled slots may be required for effective system operation.

As an overview in operation the selective messaging system receives a message from message source (101) which is coupled through terminal (103) with the appropriate MU address to system controller (105). The system controller schedules this message and any response along with all others, adds the MU address to the address field of an upcoming frame together with the vector location and forms along with all others the contents of the vector location which specify the outbound message location and inbound response location. Operation in this fashion allows for maximum battery savings in that any MU that does not see its address in the address field can go back to a battery saving mode until the next frame.

Depending on the time period since a last communication with the MU the initial communication from the system to the MU may be a where-are-you or WRU. The response from the MU will include an assessment by the MU of the acceptable transmitter(s), determined according to the above explanation, for delivering the message or by implication an indication of the current location of the MU. The system controller will then schedule delivery of the message from one or more of the acceptable transmitters in accordance with the above protocol.

Figure 3:
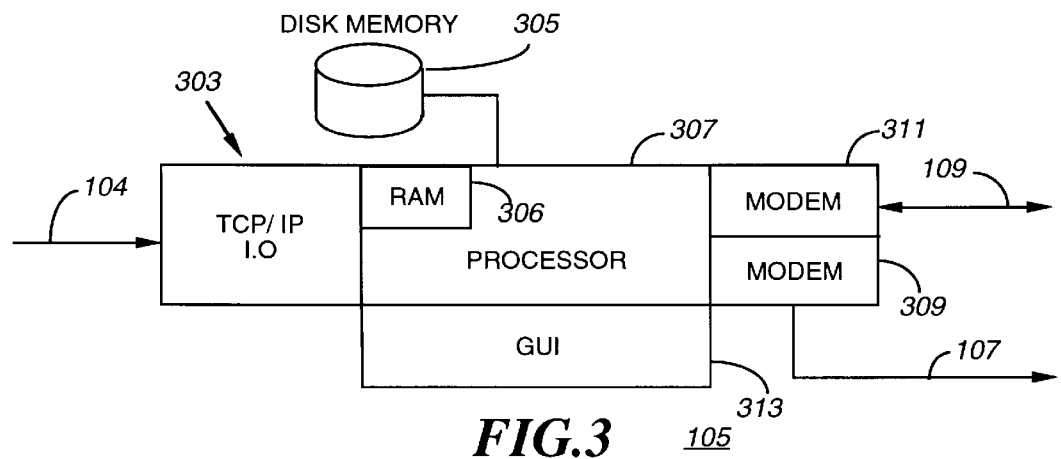
FIG. 3 depicts a preferred block diagram of a system controller suitable for use in the FIG. 1 system.

Referring to the FIG. 3 block diagram of the system controller (105) where like reference numerals refer to like elements introduced in other Figures, a more detailed discussion of a preferred embodiment of an inventive system controller will be provided. The instant system is arranged to control message delivery on the outbound channel and message reception on an inbound channel so as to reduce traffic on the network channel (109) that couples the system controller to the base receivers. The system controller includes a source port (303) for receiving a message from the message source via the terminal for delivery to a selective messaging unit, such as messaging unit (131) and a memory or disk memory (305) for storing a data base including an activity pattern of the plurality of base receivers. The source port is preferably an Ethernet port operating with the well known internet protocol commonly known as TCP/IP and the memory is a hard disk drive. The disk drive memory is also used to store a data base including location information for each of the selective messaging units.

Also the controller includes a processor (307) along with random access memory (306), coupled to the source port (303) and the memory (305), that operates to, among other functions, select an inbound schedule or select an inbound time slot (217) for a response from the selective messaging unit. The inbound schedule is selected in accordance with the activity pattern of the plurality of base receivers so as to reduce the traffic, corresponding to this inbound schedule, on the network channel.

Additionally the controller includes a transmit port (309), preferably an ordinary telephone line modem, for sending the message along with the inbound schedule to a transmitter for transmission or delivery to the selective messaging unit. The system controller further includes a network channel port (311), preferably a telephone line modem, for receiving responses from the plurality of base receivers and in particular for receiving the response during the above selected inbound slot but in one embodiment only from a first subset of a list of the plurality of base receivers that are associated by, for example, physical proximity with the MU location. The controller further includes a user interface (313), coupled to the processor, that allows the system operator to interface with the system and program various system parameters, etc.

Activity pattern is taken to mean a pattern of base receiver activity where the pattern is correlated in some fashion with the response from the MU. This correlation will exist between the apparent location of the MU and which base receivers will receive at least to some extent a response from the MU. This activity pattern may be a predetermined or managed activity pattern in that a given base receiver can be programmed, by for example the system controller, or otherwise arranged to be active in terms of reporting what it receives only during predetermined inbound time slots. In this case the system controller, specifically, processor selects the inbound schedule or selects an inbound slot where only a first subset of the list of the plurality of base receivers are active base receivers. For example, geographically adjacent base receivers are set so as not to be simultaneously active during all inbound time slots. The notion of managed activity pattern is related to the predetermined but nevertheless adjustable nature of this approach.

Alternatively the system controller when it detects a situation where likely duplicate reporting from multiple base receivers will occur can disable certain base receivers for certain time slots. Since the network channel is bidirectional and the information required to disable a base receiver is a fraction of the probable traffic generated for a response a savings is realized. This alternative is one example of an activity pattern with others including setting a quality threshold or some other legitimacy threshold that must be satisfied before a base receiver automatically reports what it receives.

Figure 4:
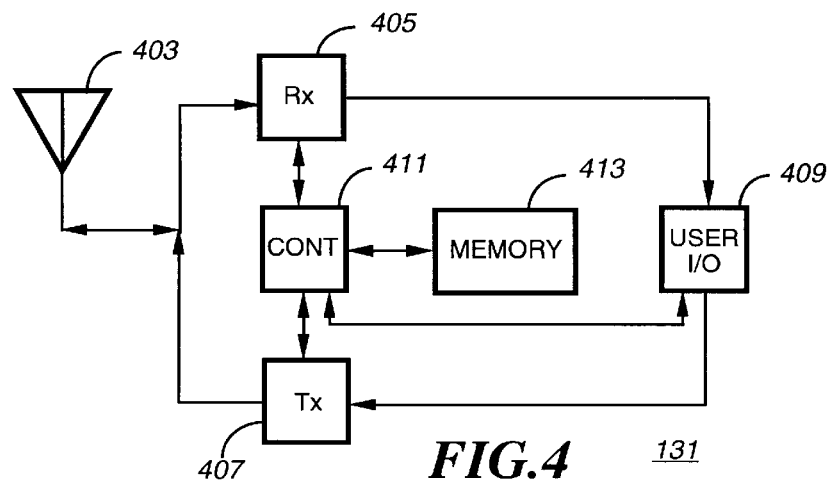
FIG. 4 depicts a preferred block diagram of a messaging unit suitable for use I the FIG. 1 system.

Referring to the FIG. 4 block diagram a discussion of a MU, preferably a two way selective messaging unit, that is arranged to operate to reduce traffic on a network channel in a two way messaging system will be provided. The two-way selective messaging unit (131) architecture is generally known and includes an antenna (403) coupled to a receiver (405) and a transmitter (407). The receiver receives messages and as appropriate provides them to a user I/O (409) under the control of a controller (411). The controller is coupled to a memory (413), the user I/O and the transmitter and generally controls the operation of the MU including what, where, and whether to receive or transmit subject to the wishes of a user. The relevant inventive operation of the MU is the focus of the remaining discussion.

The receiver also receives the SYNC portion of each outbound frame and thus receives a preferred transmitter identifier tone (ID) either from previous communication attempts with the messaging system or the information that allows a determination of the preferred transmitter ID. This preferred transmitter ID is stored in the memory that the receiver is coupled to by the controller. Along with the preferred transmitter ID is stored an activity pattern corresponding to a set of base receivers, each preferably having a receiver ID, associated, by for example geographical proximity, with said preferred transmitter. This activity pattern is preferably a predetermined pattern that is communicated to the MU by the messaging system.

When the MU has occasion to originate a message or send an unscheduled message, by definition within an unscheduled or ALOHA time slot the controller selects an inbound schedule or inbound time slot for delivery of the message in accordance with the activity pattern so as to reduce the traffic on the network channel corresponding to the message. The transmitter transmits the message in accordance with this inbound schedule or during this selected time slot.

For example the controller may select an ALOHA time slot where only a certain set or limited number of base receivers that are geographically associated with or physically close to the preferred transmitter are active. If within this set some receivers are active during one time slot and others during another a transmission in either will not generate duplicate network channel traffic. A savings can be realized if the controller picks an ALOHA slot where only a subset of the set of base receivers are active. The MU can take a more active role by selecting a base receiver that should be active and indicating that base receiver ID during the selected ALOHA slot. Only the indicated base receiver automatically reports the message to the system controller.

Figure 5:
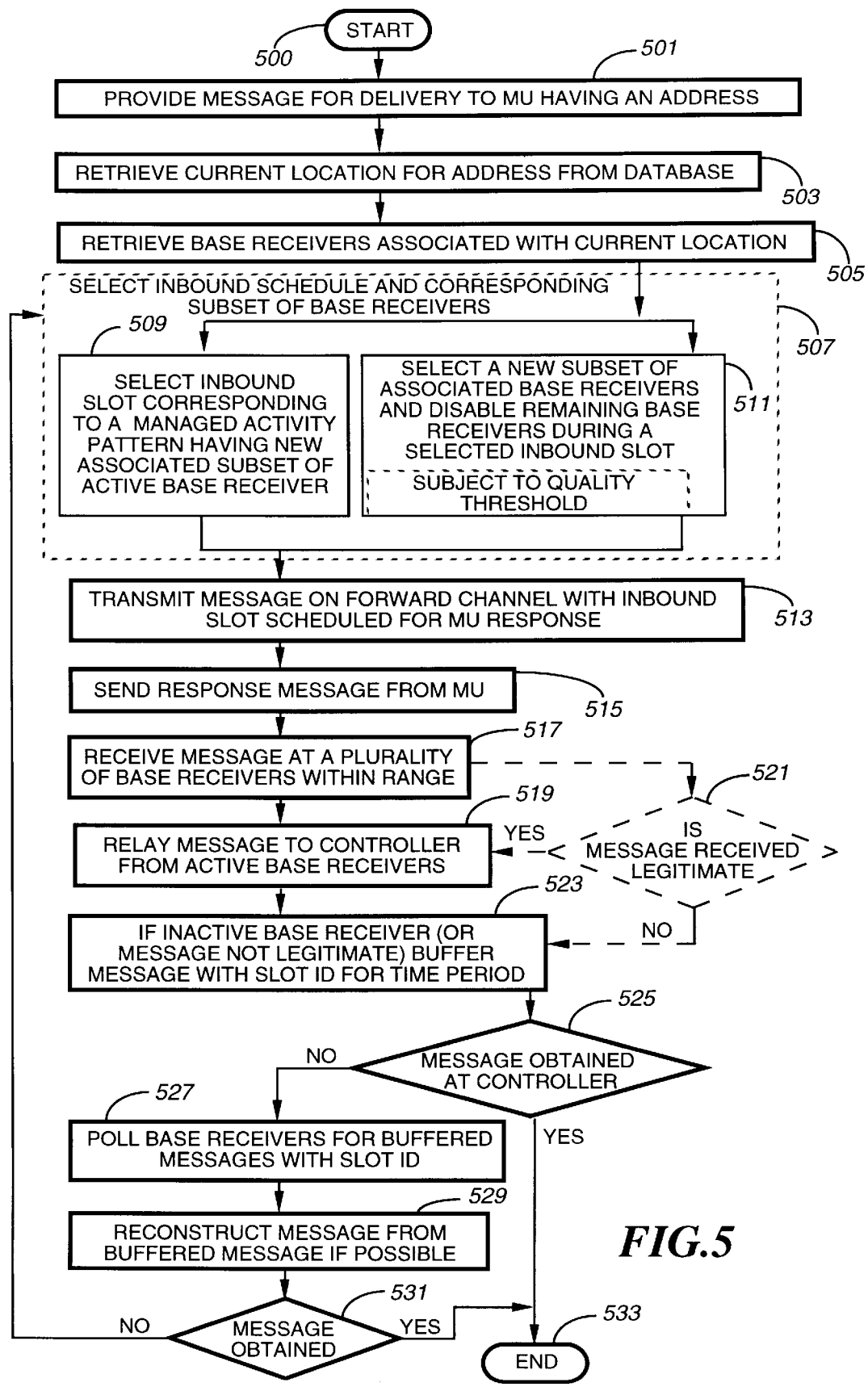
FIG. 5 depicts a flowchart of a preferred method of operation from the perspective of the FIG. 1 system.

Referring to the FIG. 5 flowchart, a more detailed discussion of a preferred method embodiment in accordance with the instant invention will be provided. This embodiment is a method of reducing traffic on the network channel of a two way selective messaging system, such as the system of FIG. 1, that includes a controller coupled to a plurality of base receivers by a network channel. The selective messaging system is arranged to provide message delivery on an outbound channel and message reception on an inbound channel and the methods are preferably practiced by a system controller.

The method begins at (500) after which step (501) obtains or provides a message for delivery to a selective MU having an address. Step (503) then retrieves a current location corresponding to the MU from a data base. This location is obtained according to the procedures discussed earlier and the database information may be used as is if relatively recently obtained or the system may have to go through a where are you procedure to get updated information. Given this current location, step (505) retrieves a list, preferably entered by the system operator using coverage data and from time to time modified given system operating experience, of the plurality of base receivers that are associated, by for example geographic proximity, with the current location.

Then step (507) selects an inbound schedule for a response to the message from the MU and a corresponding subset of the list of base receivers. Step (507) includes alternatively two steps. One, step (509) selects the inbound slot or schedule corresponding to a managed or predetermined activity pattern that has an associated subset of active base receivers. In this case step (509) selects an inbound schedule or inbound slot where only a first subset of said list of said plurality of base receivers are active base receivers. Two, step (511) selects a subset of the list of associated base receivers and actively disables the remaining base receivers during a selected inbound slot. As a further enhancement to step (511) or step (509) a quality or legitimacy threshold may be enabled where in any base receiver that receives a response is disabled in that it will not automatically report that result.

In any event steps (503–507) collectively are directed to selecting an inbound schedule or inbound time slot for a response message from the selective messaging unit where the inbound schedule selected is in accordance with an activity pattern of the plurality of base receivers so as to thereby reduce traffic, corresponding to the response message, on the network channel. The traffic reduction comes about by avoiding duplicative or incomplete and erroneous received responses being forwarded to the system controller.

After step (507) step (513) transmits the message on the forward channel with the inbound schedule or slot scheduled for a response from the MU in accordance with the methodology discussed with reference to FIG. 2. Given the schedule for a response if the MU the message was intended for is active, step (515) is directed to sending or transmitting a response message, such as an acknowledgment, from the MU on the prescribed inbound slot and step (517) indicates reception of that response message at a plurality of base receivers within range of the MU or a portion of the list of associated base receivers. Step (519) relays this message as received to the system controller from the active base receivers. Optional step (521) conditions the performance of step (519) on a legitimacy test of the message received. For example if the message is erroneous based on a CRC check or if the received quality does not satisfy a threshold at any of the base receivers, that base receiver will not perform step (519). In any event step (523) results in received messages at inactive base receivers or received messages that have not satisfied the legitimacy test of step (519) being buffered along with a slot ID at the base receiver for a time period sufficient for the system the next two steps.

Step (525) determines whether a message, usually acknowledge message, was obtained at the controller as expected and if so the process ends at (533). If not step (527) is directed to polling base receivers, normally the inactive ones or active ones that did not report for their respective buffered messages with the appropriate slot ID. Step (529) then constructs a message from the buffered messages if possible as tested at step (531). If the message is obtained again the process ends at (533) and if not the process loops back to step (507) for selection of a new inbound schedule or slot and, preferably, different set of base receivers or different threshold or the like for a repeated attempt to deliver the message. Alternatively the process may loop all the way back to step (503) to insure that the location information for the MU is up to date.

Figure 6:
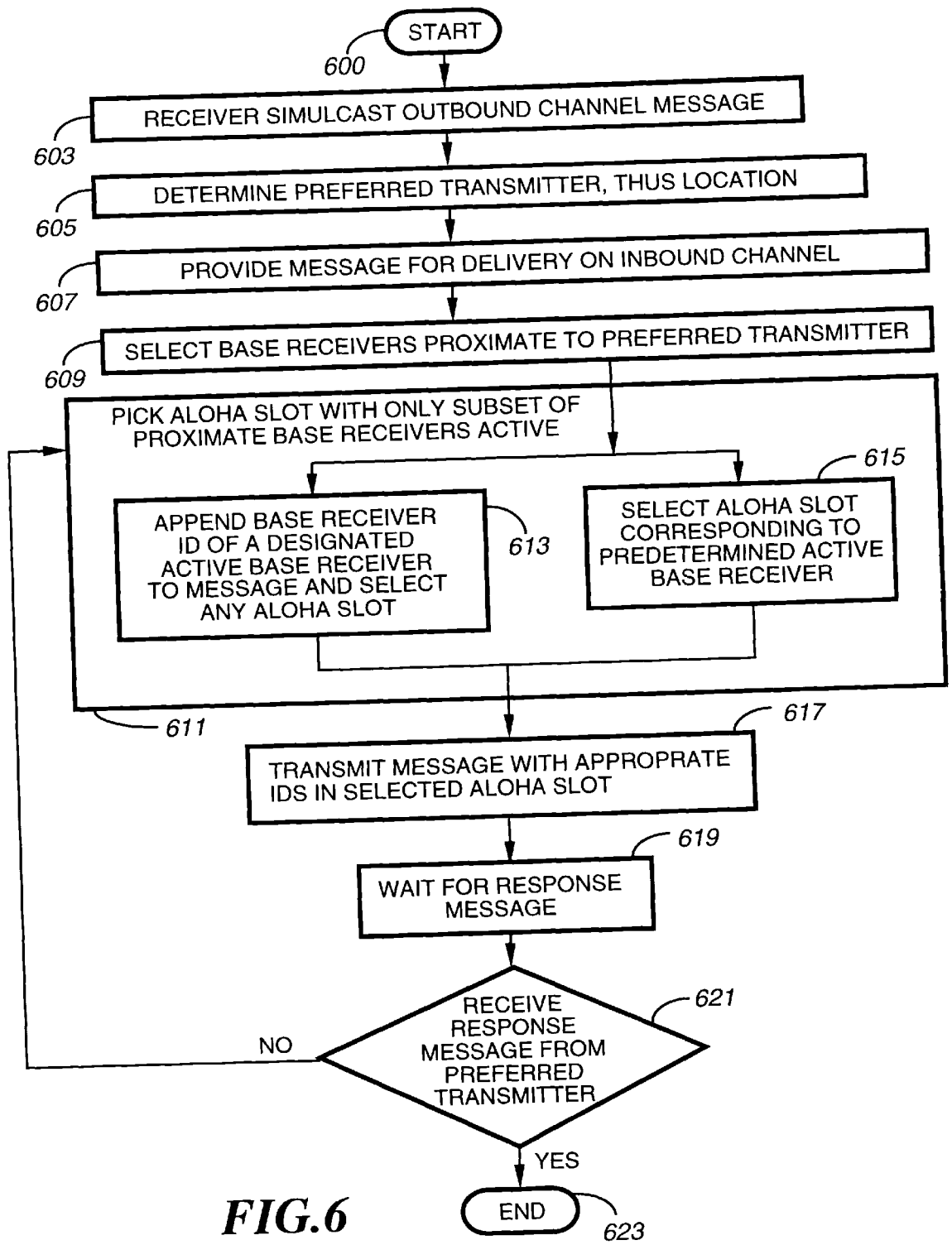
FIG. 6 depicts a flowchart of an alternative method embodiment from the perspective of the FIG. 4 messaging unit.

Referring to the FIG. 6 flowchart, a more detailed discussion of an alternative method embodiment in accordance with the instant invention will be provided. This flowchart depicts a method, preferably practiced at an MU, of reducing traffic on the network channel in a selective messaging system arranged to provide message reception on an inbound channel. The method starts at (600) and step (603) indicates the reception of simulcast outbound channel message. This outbound message is in accordance with the discussion above referring to FIG. 2 and the determination of a preferred transmitter and contains the requisite information that enables step (605) to determine a preferred transmitter, thus implicitly location for the MU. Step (607) is directed to providing a message, such as a registration request or other user generated message, for delivery on the inbound channel to the system controller. Step (609) selects the base receivers proximate to the preferred transmitter by accessing a data base within memory. The database is, preferably, maintained by the system controller and provided at least in relevant part from time to time to the MU.

Step (611) is devoted to picking or selecting an ALOHA or unscheduled inbound slot where only a subset of the proximate base receivers are active. Step (611) includes two usually as depicted alternative steps that could be arranged serially if so desired. One, step (615), indicates that the ALOHA slot selected corresponds to a predetermined active base receiver, the predetermination accomplished as earlier discussed. The other, step (613) depicts designating an active base receiver and appending a corresponding base receiver ID to the inbound message and then selecting any ALOHA slot.

In any event steps (605–611) are collectively engaged in selecting an inbound schedule for delivery of the message where the inbound schedule selected considers an activity pattern of the plurality of base receivers so as to thereby reduce the traffic on the network channel corresponding to the inbound schedule and message. Again the reduction is accomplished by avoiding redundant receptions that are forwarded to the controller. Having determined the inbound schedule or time slot, step (617) transmits the message during that slot along with base receiver IDs when appropriate. The base receiver ID indicates directly which base receiver is expected to be active and to report the inbound message to the controller. Step (619) denotes waiting for a response from, preferably, the preferred transmitter as tested at step (621). If so the process ends at (623) and if not step (611) is repeated and a new inbound time slot is selected.

It will be appreciated by those of ordinary skill in the art that the apparatus and methods disclosed provide various approaches for reducing the traffic on the network channel of a messaging system that is set up for two way operation. These inventive approaches do not unduly compromise any signal or system characteristic or otherwise unnecessarily burden processing resources. These inventive structures and methods may be readily and advantageously employed in a wireless selective messaging system, system controller or messaging unit to provide reduced network traffic with the resultant economic benefits in the form of lower leasing fees for the network channel.

It will be apparent to those skilled in the art that the disclosed invention may be modified in numerous ways and may assume many embodiments other than the preferred forms specifically set out and described above. For example many of the inventive procedures and apparatus described in a preferred form of managed activity patterns may be enhanced with historical base receiver activities correlated to MU locations. Accordingly, it is intended by the appended claims to cover all modifications of the invention which fall within the true spirit and scope of the invention.

What is claimed is:

1. In a two way selective messaging system including a controller coupled to a plurality of base receivers by a network channel, the selective messaging system arranged to provide message delivery on an outbound channel and message reception on an inbound channel, a method of reducing traffic on the network channel including the steps of;

providing a message for delivery to a selective messaging unit and an activity pattern corresponding to a set of base receivers associated with a preferred transmitter, selecting an inbound schedule for a response message from said selective messaging unit, said inbound schedule selected in accordance with said activity pattern to reduce traffic, corresponding to said response message, on the network channel, and transmitting said message on the outbound channel along with said inbound schedule.

2. The method of claim 1 where in said step of selecting an inbound schedule includes selecting said inbound schedule in accordance with a managed activity pattern.

3. The method of claim 2 further including a step of retrieving a location information for said selective messaging unit and a list of said plurality of base receivers that are associated with said location.

4. The method of claim 3 wherein said step of selecting an inbound schedule further includes selecting an inbound slot where only a first subset of said list of said plurality of base receivers are active base receivers.

5. The method of claim 4 further including a step of receiving said response message during said inbound slot at a portion of said list of said plurality of base receivers.

6. The method of claim 5 further including a step of relaying to said controller said response message only from each of said active base receivers.

7. The method of claim 6 further including a step of buffering said response message at each base receiver that belongs to said portion and was not an active base receiver.

8. The method of claim 7 further including a step of testing the legitimacy of the response message as received at each active base receiver and relaying said response message as received only when legitimate and otherwise buffering said response message as received.

9. In a two way selective messaging system including a controller coupled to a plurality of base receivers by a network channel, the selective messaging system arranged to provide message reception on an inbound channel, a method of reducing traffic on the network channel including the steps of;

providing a message for delivery to the controller and in activity pattern corresponding to a set of base receivers associated with a preferred transmitter, selecting an inbound schedule for delivery of said message, said inbound schedule selected in accordance with said activity pattern to reduce the traffic on the network channel corresponding to said inbound schedule, and transmitting said message on the inbound channel in accordance with said inbound schedule.

10. The method of claim 9 further including a step of determining a location for said step of transmitting.

11. The method of claim 10 wherein said step of selecting includes a further step of selecting said set of base receivers proximate to said location.

12. The method of claim 11 wherein said step of selecting includes picking an ALOHA slot where only a subset of said set of base receivers are active.

13. The method of claim 11 wherein said step of selecting additionally includes a step of selecting any ALOHA slot and selecting a base receiver ID corresponding to one base receiver from said set of base receivers and indicating said base receiver ID to said set.

14. The method of claim 12 wherein said step of selecting additionally includes a step of selecting an ALOHA slot corresponding to a predetermined active base receiver.

15. A system controller for a two way selective messaging system, the system controller coupled to a message source and further coupled to a plurality of base receivers by a network channel and arranged to control message delivery on an outbound channel and message reception on an inbound channel so as to reduce traffic on the network channel, the system controller including in combination;

a source port for receiving a message from said message source for delivery to a selective messaging unit, a memory for storing a data base including an activity pattern corresponding to a set of base receivers associated with a preferred transmitter, a processor, coupled to said source port and said memory for selecting an inbound schedule for a response from said selective messaging unit, said inbound schedule selected in accordance with said activity pattern of the plurality of base receivers thereby reducing the traffic on the network channel corresponding to said inbound schedule, and a transmit port for sending said message along with said inbound schedule to said preferred transmitter.

16. The system controller of claim 15 wherein said processor selects said inbound schedule in accordance with a managed activity pattern.

17. The system controller of claim 16 wherein said memory further stores a data base including a location information for said selective messaging unit and said processor retrieves a list of said plurality of base receivers that are associated with said location.

18. The system controller of claim 17 wherein said processor selects said inbound schedule by further selecting an inbound slot where only a first subset of said list of said plurality of base receivers are active base receivers.

19. The system controller of claim 18 further including a network channel port for receiving said response during said inbound slot only from said first subset of said list of said plurality of base receivers.

20. A two way selective messaging unit arranged to operate to reduce traffic on a network channel in a two way messaging system that includes a system controller coupled to a plurality of base receivers by the network channel, the two-way selective messaging unit comprising in combination;
- a memory for storing a preferred transmitter ID and an activity pattern corresponding to a set of base receivers associated with a preferred transmitter,
- a controller, coupled to said memory, for selecting an inbound schedule for delivery of a message, said inbound schedule selected in accordance with said activity pattern to reduce the traffic on the network channel corresponding to said message, and
- a transmitter for transmitting said message in accordance with said inbound schedule.

21. The two way selective messaging unit of claim 20 further including a receiver, coupled to said memory, for receiving said preferred transmitter ID.

22. The two way selective messaging unit of claim 21 wherein said controller selects a set of base receivers geographically associated with said preferred transmitter ID.

23. The two way selective messaging unit of claim 22 wherein said controller further picks an ALOHA slot where only a subset of said set of base receivers are active.

24. The two way selective messaging unit of claim 23 wherein said controller further selects an ALOHA slot and selects a base receiver ID corresponding to one base receiver from said subset of said set of base receivers and indicates said base receiver ID to said subset.

25. The two way selective messaging unit of claim 23 wherein said controller further selects an ALOHA slot corresponding to a predetermined active base receiver.

* * * * *